2,956,981

REACTION PRODUCTS OF DIALKYLOL THIO-UREAS AND DISUBSTITUTED PHENYLENEDI-AMINES AS ANTIOZONANTS

Harry E. Albert, Lafayette Hill, Pa., assignor to The Firestone Tire & Rubber Company, Akron, Ohio, a corporation of Ohio No Drawing. Original application Jan. 31, 1956, Ser. No. 562,596. Divided and this application Mar. 20, 1958, Ser. No. 722,662

6 Claims. (Cl. 260—45.9)

This invention relates to reaction products of dialkylol thioureas and N,N'-dialkyl phenylenediamines as antiozonants in rubber.

The dialkylol thioureas may be prepared in any suitable manner as, for example, by the aldehyde process of Pollak, F., Modern Plastics 16, No. 10, 45, 74, 76 (1939). Various aldehydes can be used in preparing the dialkylol thioureas as, for example, formaldehyde, acetaldehyde, propionaldehyde, or butyraldehyde. The dialkylol thioureas have the formula

HOCHR.NH.CS.NH.CHR.OH in which each R can be hydrogen or an alkyl group of 1 to 3 carbon atoms.

The N,N'-dialkyl phenylenediamines can be ortho or para isomers and can have nuclear substituents. The alkyl substituents can be the same or different, and each can contain from 1 to 12 carbon atoms. Although these disubstituted phenylenediamines are antiozonants in rubber, many members of the class are extremely toxic, and for this reason it is difficult to handle them in commercial operations. Others are non-toxic and very useful.

Oxygen and ozone both have a harmful effect on rubber, but the effect of each is different, and compounds which inhibit or prevent the harmful effect of one are not necessarily effective in stopping or retarding the harmful effect of the other.

Crabtree and Kemp in an article in Industrial and Engineering Chemistry, vol. 38, starting at page 278 (1946) explain the difference in the action of oxygen and ozone on rubber. The light-catalyzed oxidation which occurs during outdoor exposure forms a skin and crazed appearance over the exposed surface of the rubber. Ozone, on the other hand, even in very low concentration, induces cracking in rubber, but only if the rubber is stretched. (C. H. Leigh-Dugmore, Rubber Age and Synthetics, November and December 1952.) The cracks are perpendicular to the direction of stretch. Such cracking can occur in the absence of light. Compounds which inhibit the effect of ozone on rubber are referred to herein as antiozonants.

Tires are stressed when inflated. While a tire is at rest it is stretched statically, and on a moving vehicle it is stretched dynamically, i.e., it undergoes alternating stretching and relaxing. Some of the antiozonants are more effective in static tests and others are more effective in dynamic tests. Antiozonants which are effective under both conditions will be desired for tires, but for other rubber products an antiozonant which does not meet both tests may be used.

The inhibiting effect of the antiozonants of this invention on rubber was determined by treatment of unaged, cured stocks with air of controlled ozone content in specially designed equipment. The test was conducted with one-half inch dumbbell samples of approximately 100 gauge thickness. The special apparatus for testing with air of controlled ozone content, and the method of testing therein are described in the articles by Ford and Cooper, appearing in India Rubber World for September and October 1951, entitled "A Study of the Factors Affecting the Weathering of Rubber-Like Materials—I and II." The following test results refer to a test in which the ozone concentration was maintained at 60 parts per 100,000,000 parts of air. Two types of tests were conducted. In one type, called the dynamic test, the sample was repeatedly stretched between the limits of 0 and 20 percent elongation at the rate of 108 cycles per minute. In the other type of test, the static test, the samples were stretched at 12.5 percent elongation throughout the test. On completion of each test the number and size of the cracks in each sample were compared visually with the number and size of the cracks in a blank strip from the same masterbatch which contained no antiozonant and which was cured and tested at the same time as the test sample. The number of cracks was reported on an arbitrary scale as follows: "none," "very, very few" (or "v.v. few"), "very few," "few," "moderate," "moderate-to-numerous," and "numerous." The size of the cracks was reported according to an arbitrary scale as follows: "very slight" (or "v. slight"), "slight," "moderate," "severe," and "very severe."

In the reported test 2.0 parts by weight of the antiozonant and N,N'-di-sec-butyl-p-phenylenediamine, respectively, were added to the masterbatch for each 100 parts of rubber present. The latter stock was used as a control.

The reported results include data on the tensile properties of the cured rubber stocks before and after aging 2 days in an oven at 212° F. The modulus and tensile strength are given in pounds per square inch, and the elongation is reported as percent of stretch at the break. These data are included to show that the antiozonant has no substantial deleterious effect upon the cure or upon the aging of the cured stock.

The antiozonants are effective in the vulcanizates of both natural and synthetic rubbers, as, for example, those produced by polymerizing or copolymerizing a conjugated diene, as, for example, 1,3-butadiene (or hydrocarbon homologue thereof) with an ethylenically unsaturated monomer as, for example, styrene, acrylonitrile, methacrylonitrile, or an ester of vinyl alcohol, as ester of acrylic or methacrylic acid, vinylpyridine, vinylcarbazole or other low-molecular-weight vinyl monomer, etc.

The rubber can be vulcanized with sulfur or a sulfur donor, or with a cross-linking agent such as a dithiol, nitro- or nitroso-compound, a quinone dioxime, etc. Known vulcanization accelerators are useful in speeding up the vulcanization process and are operative herein, especially the relatively active accelerators including the thiazole sulfenamides, e.g., N-cyclohexyl-2-benzothiazole-sulfenamide, thiazoline sulfenamides, thiocarbamyl sulfenamides, mercaptothiazoles, mercaptothiazolines, thiazolyl mono- and di-sulfides, the N,N-disubstituted dithiocarbamates, the thiuram sulfides, the xanthogen sulfides, and metallic salts of mercaptothiazoles or mercaptothiazolines or dithiocarbamic acids.

One or more accelerator activators are often used with any of the accelerators mentioned, and such activators include the various derivatives of guanidine known in the rubber art, amine salts of inorganic and organic acids, various amines themselves, and alkaline salts such as sodium acetate and the like, as well as other activators known in the art. Additionally, two or more accelerators or accelerator combinations are sometimes desirable in a single rubber compound. Many of the accelerators mentioned above are suitable in latex formulations, especially such common accelerators as piperidinium pentamethylene dithiocarbamate, zinc butylxanthate, zinc ethylxanthate, zinc salt of mercaptobenzothiazole, zinc dimethyldithiocarbamate, and zinc dibutyldithiocarbamate. Although vulcanization is usually accomplished by heating a vulcanizable rubber composition at a temperature in the range of 240 to 400° F. for a time ranging from several hours to a few seconds, vulcanization does take place at lower temperatures such as ordinary room temperature. It is quite common to vulcanize a latex film containing an ultra-accelerator by allowing the film to remain at room temperature for several hours or a few days.

The following example illustrates the preparation of the reaction products.

EXAMPLE 1

To 6.3 grams (0.08 mole) of thiourea in 50 ml. of water there was added 12.5 grams of aqueous formaldehyde (36% by weight=0.15 mole). A few drops of acetic acid were added as the catalyst and the mixture was stirred for two hours at 45 to 50° C. Then 33 grams (0.15 mole) of N,N'-di-sec-butyl-p-phenylenediamine was added and the reaction mixture was stirred two hours at room temperature. It was then heated for two hours at 95° C. Thirty-five grams of a dark brown viscous liquid was obtained.

Other N,N'-dialkyl phenylenediamines which can similarly be reacted include the following:

*o- and p-Phenylenediamines*

N-methyl, N'-sec-butyl
N-1-methylbutyl, N'-1-methylheptyl
N-octyl, N'-sec-butyl
N-undecyl, N'-isopropyl
N,N'-diethyl
N,N'-di-n-butyl
N,N'-didodecyl
N,N'-dimethyl
N,N'-dihexyl
N,N'-dinonyl
N-methyl, N'-undecyl
N-sec-butyl, N'-dodecyl
N-isopropyl, N'-amyl
N,N'-diisopropyl
N,N'-di(1-methylheptyl)
N,N'-di(1-methyloctyl)

In carrying out the reaction one or both hydroxyl groups of the dialkylol thiourea react with hydrogen of one or both the amino groups of the N,N'-dialkyl phenylenediamine or with the nuclear hydrogen atoms. The product of Example 1 was prepared using a ratio of 0.5 mole of dialkylolthiourea to 1 mole of N,N'-dialkylphenylenediamine. A larger ratio of dialkylolthiourea may be employed, the theoretical upper limit per mole of N,N'-dialkylphenylenediamine being $n/2$ moles of dialkylolthiourea where $n/2$ is the number of reactive hydrogens (nuclear or on nitrogen) in the N,N'-dialkylphenylenediamine molecule. Actually it would not be desirable to use a mole ratio greater than about 2 for the use of a ratio which is too high would give too many dimethylenethiourea cross-links between the N,N'-dialkyl-p-phenylenediamine molecules.

Tests were made using a tread stock masterbatch having the following formula:

| | Parts by weight |
|---|---|
| GR–S | 100 |
| Sulfur | 1.7 |
| Black | 45 |
| Stearic acid | 2.5 |
| Zinc oxide | 2.4 |
| Softener | 6.6 |
| Accelerator | 1.2 |

The test strips were cured 80 minutes at 280° F.

A blank of the foregoing composition was tested simultaneously with a compound containing two parts of the reaction product prepared according to Example 1, and two parts of unreacted N,N'-di-sec-butyl-p-phenylenediamine. The results of the test, giving the physical properties of the cured product and the results of ozone tests (conducted as explained) are recorded in the following table in which the compositions are identified as "Blank," "Test," and "Control," respectively.

TABLE I

| | Blank | Test | Control |
|---|---|---|---|
| Masterbatch | 159.4 | 159.4 | 159.4 |
| Reaction Product of Example 1 | | 2 | |
| N,N'-di-sec-butyl-p-phenylenediamine | | | 2 |
| Normal Tensile Properties: | | | |
| 300% Modulus | 900 | 800 | 875 |
| Tensile strength | 3200 | 3550 | 3600 |
| Elongation | 595 | 625 | 625 |
| After Aging (2 days at 212° F.): | | | |
| 300% Modulus | 2000 | 1775 | 1825 |
| Tensile strength | 2250 | 2775 | 2700 |
| Elongation | 320 | 395 | 395 |
| Ozone Effects (4 hrs., 60 pphm., 95° F.): | | | |
| Static: | | | |
| Size | severe | slight | no. |
| Frequency | moderate | v.v. few | none. |
| Dynamic: | | | |
| Size | moderate | v. slight | no. |
| Frequency | numerous | v.v. few | none. |

The foregoing shows that the product has good antiozonant properties. It is more persistent than the N,N'-di-sec-butyl-p-phenylenediamine used as the control. This is a natural consequence of its having a greater molecular weight.

An important advantage of the reaction product of Example 1 is its lower toxicity as indicated in the following table in which the sensitivity effect is recorded. These results were determined by exposing 15 human subjects in each case to patch tests using 5% of the test material in cold cream. Two patch tests of 48 hours duration were used, the time between the two exposures being about 14 days. The results of the second patch test are indicative of the sensitization effect. The degree of the effect is noted by using a scale of 1 to 4 plus signs.

TABLE II

| Product | Sensitization | | Rating |
|---|---|---|---|
| | No. of subjects | Severity | |
| Reaction product of Example 1 | 1 | ++++ | Slightly sensitizing. |
| | 4 | +++ | |
| | 2 | ++ | |
| | 5 | + | |
| | 3 | ± | |
| N,N'-di-sec-butyl-p-phenylenediamine | 10 | ++++ | Extremely sensitizing. |
| | 1 | +++ | |
| | 3 | ++ | |
| | 1 | + | |

Hence the reaction product of Example 1 is considerably less sensitizing than the compound from which it is prepared.

The antiozonant of Example 1 was compared with N,N'-di-sec-butyl-p-phenylenediamine and with a blank (no antiozonant) from the standpoint of natural weathering at Akron, Ohio, using the tread stock formulation given previously. Dumbbell strips were exposed at an elongation of 12.5% in this test. At the end of 28 days the stock containing the antiozonant of Example 1 and the stock containing N,N'-di-sec-butyl-p-phenylenediamine showed no cracking while the stock containing no antiozonant showed severe cracking. After 2 months exposure, the tire stocks prtoected by antiozonants were essentially equal. Hence, these data again demonstrate the compound of Example 1 to be an effective antiozonant.

The antiozonant will be used in any small amount as, for example, 0.1 to 10 parts per 100 parts of rubber. This application is a division of my copending application Serial No. 562,596, filed January 31, 1956, now abandoned.

The invention is more particularly defined in the claims which follow.

What I claim is:

1. Sulfur vulcanized rubber of the class consisting of natural and synthetic rubbers which are from the class consisting of homopolymers of conjugated dienes and copolymers of conjugated dienes and ethylenically unsaturated monomers, the rubber being stabilized with an antiozonant amount of acid-catalyzed, elevated-temperature reaction product of (1) 0.5 to 2.0 moles of dialkylol thiourea in which the alkylol groups contain 1 to 4 carbon atoms, and (2) 1.0 mole of N,N'-di-sec-butyl-p-phenylenediamine.

2. The vulcanized rubber of claim 1 in which the dialkylol thiourea of the reaction product is dimethylol thiourea.

3. Synthetic rubber which is a copolymer of butadiene and styrene which is sulfur-vulcanized and stabilized with a small amount of acid-catalyzed, elevated-temperature reaction product of 0.5 to 2.0 moles of dimethylol thiourea and 1.0 mole of N,N'-di-sec-butyl-p-phenylenediamine.

4. The method of vulcanizing natural and synthetic rubbers of the class consisting of homopolymers of conjugated dienes and copolymers of conjugated dienes and ethylenically unsaturated monomers, which method comprises vulcanizing the same with sulfur in the presence of an antiozonant amount of acid-catalyzed, elevated-temperature reaction product of (1) 0.5 to 2.0 moles of dialkylol thiourea in which the alkylol groups contain 1 to 4 carbon atoms, and (2) 1.0 mole of N,N'-di-sec-butyl-p-phenylenediamine.

5. The method of claim 4, using a reaction product as there described in which the dialkylol thiourea is dimethylol thiourea.

6. The method of vulcanizing synthetic rubber which is a copolymer of butadiene and styrene, which method comprises vulcanizing the same with sulfur in the presence of an antiozonant amount of acid-catalyzed, elevated-temperature reaction product of 0.5 to 2.0 moles of dimethylol thiourea and 1.0 mole of N,N'-di-sec-butyl-p-phenylenediamine.

References Cited in the file of this patent

UNITED STATES PATENTS

| | | |
|---|---|---|
| 2,651,667 | Hill et al. | Sept. 8, 1953 |
| 2,849,420 | Stevens et al. | Aug. 26, 1958 |

OTHER REFERENCES

Shaw et al.: "Antiozidants for GR–S Rubber," Rubber World, August 1954, vol. 130, No. 5, pp. 637 and 638.